United States Patent
Takahashi et al.

(10) Patent No.: US 9,732,291 B2
(45) Date of Patent: Aug. 15, 2017

(54) BIOMASS GASIFICATION SYSTEM

(71) Applicant: Tesna Energy Co., Ltd., Tokyo (JP)

(72) Inventors: Kiminori Takahashi, Saitama (JP); Takashi Yamamoto, Okegawa (JP)

(73) Assignee: Tesna Energy Co., Ltd., Tokyo (JP)

( * ) Notice: Subject to any disclaimer, the term of this patent is extended or adjusted under 35 U.S.C. 154(b) by 0 days.

(21) Appl. No.: 15/122,496

(22) PCT Filed: Dec. 17, 2015

(86) PCT No.: PCT/JP2015/085309
§ 371 (c)(1),
(2) Date: Aug. 30, 2016

(87) PCT Pub. No.: WO2016/185635
PCT Pub. Date: Nov. 24, 2016

(65) Prior Publication Data
US 2017/0152452 A1    Jun. 1, 2017

(30) Foreign Application Priority Data
May 19, 2015    (JP) .................................. 2015-101951

(51) Int. Cl.
*C10J 3/00* (2006.01)
*C10J 3/46* (2006.01)
(Continued)

(52) U.S. Cl.
CPC ................ *C10J 3/30* (2013.01); *B65G 33/14* (2013.01); *F23G 5/027* (2013.01); *F23G 5/444* (2013.01);
(Continued)

(58) Field of Classification Search
CPC combination set(s) only.
See application file for complete search history.

(56) References Cited

U.S. PATENT DOCUMENTS 3,950,143 A * 4/1976 Pyle ........................ C10B 53/02
                                                           201/35
4,197,092 A * 4/1980 Bretz ........................ C10J 3/487
                                                           110/101 R
(Continued)

FOREIGN PATENT DOCUMENTS

JP         2009270050 A       11/2009
JP         2013185093 A        9/2013
(Continued)

OTHER PUBLICATIONS

Kenichi Mori, International Search Report—PCT/JP2015/085309, Mar. 8, 2016, 2 pages, Japanese Patent Office as International Searching Authority,Tokyo, Japan.
(Continued)

*Primary Examiner* — Kaity Chandler
(74) *Attorney, Agent, or Firm* — Crain, Caton & James, P.C.; James E. Hudson, III

(57) ABSTRACT

A biomass gasification system for producing aqueous or water gases after biomass has been carbonized is disclosed. Temperatures of a thermal decomposition and gasification furnace can be quickly and uniformly stabilized with smaller thermal loss. Reaction residuals after thermal decomposition and gasification are prevented from adhering on the inner surface of the system. The biomass gasification system comprises: a main body, a first cylindrical member, a first cut-out member, a first cylinder accommodating therein a first screw conveyor, a second cylindrical member, a second cut-out member, a second cylinder accommodating therein a second screw conveyor. The first cylinder is so constructed that it penetrates the main body, the first cylindrical member and the first cut-out member in an axial direction. The first screw conveyor, the second screw conveyor and the second (Continued)

cut-out member have a plurality of gasifying agent ports, respectively.

5 Claims, 6 Drawing Sheets

(51) Int. Cl.
    *C10J 3/30*     (2006.01)
    *B65G 33/14*     (2006.01)
    *F23G 5/027*     (2006.01)
    *F23G 5/44*     (2006.01)

(52) U.S. Cl.
    CPC .. *C10J 2200/158* (2013.01); *C10J 2300/0916* (2013.01)

(56) References Cited

U.S. PATENT DOCUMENTS

| | | | | |
|---|---|---|---|---|
| 4,218,222 A * | 8/1980 | Nolan, Jr. | ............... | B01J 3/02 264/118 |
| 4,224,286 A * | 9/1980 | Murase | ............... | B01J 21/20 34/168 |
| 4,919,686 A * | 4/1990 | Edwards | ............... | C10B 53/00 201/25 |
| 4,968,325 A * | 11/1990 | Black | ............... | C10J 3/482 422/143 |
| 4,980,029 A * | 12/1990 | Bolz | ............... | C10B 47/18 202/105 |
| 5,945,005 A * | 8/1999 | Junius | ............... | B01D 24/002 210/786 |
| 6,126,907 A * | 10/2000 | Wada | ............... | C10B 7/10 110/246 |
| 6,189,463 B1 * | 2/2001 | Ling | ............... | F23G 1/00 110/110 |
| 2012/0043194 A1 * | 2/2012 | Lepez | ............... | C10B 7/10 201/10 |
| 2012/0217150 A1 * | 8/2012 | Kostek, Sr. | ............... | B01D 5/0006 202/108 |
| 2013/0109564 A1 * | 5/2013 | Miller | ............... | C10J 3/30 502/400 |

FOREIGN PATENT DOCUMENTS

| | | |
|---|---|---|
| JP | 5940756 B | 5/2016 |
| WO | 2006059496 A1 | 6/2006 |
| WO | 2014069234 A1 | 5/2014 |

OTHER PUBLICATIONS

Kenichi Mori, Written Opinion of the International Searching Authority—PCT/JP2015/085309, Mar. 8, 2016, 5 pages, Japanese Patent Office as International Searching Authority, Tokyo, Japan.

* cited by examiner

BIOMASS GASIFICATION SYSTEM

CROSS-REFERENCE TO RELATED APPLICATIONS

This application claims the priority of PCT Patent Application No. PCT/JP2015/085309, filed on Dec. 17, 2015 for "Biomass Gasification System," which is incorporated herein by reference.

TECHNICAL FIELD

The present invention relates to a biomass gasification system for producing aqueous gasses after carbonizing of biomass.

BACKGROUND OF INVENTION

In recent years, while attention has strongly been paid to utilization of recycling or renewable energy, especially, attention has been paid to or focused on utilization of biomass energy as one of recycling or renewable energy.

There exist various forms in utilization of biomass energy. As one of such forms, such system as producing aqueous gasses from biomass, then for generating electric powers and further for providing heat has been proposed.

For producing aqueous gasses from biomass, first of all, carbonization of biomass is necessary. For example, a carbonizing furnace which comprises a cylindrical body and an inner cylindrical member accommodated therein is disclosed in, for example, Patent Document 1.

For producing aqueous gasses from the carbonized biomass, steps of thermal decomposition and gasification are necessary. For example, in Patent Document 2, there is disclosed a thermal decomposition gasification apparatus which is formed by an outer cylindrical member, an inner cylindrical member, a turn-table and heat-storage projection members.

As explained above, in the course of producing aqueous gasses from biomass, largely divided, two steps are needed, one for carbonization of biomass and second for thermal decomposition and gasification of the carbonized biomass. In the prior art, these steps have been performed separately by the above mentioned separate apparatuses.

However, since such conventional system requires two separate apparatuses, one for carbonization of biomass and the other for thermal decomposition and gasification of the carbonized biomass, there inevitably occurs large thermal loss. Further, it takes a considerable long time until the temperature of furnace for thermal decomposition and gasification is stabilized where the heat generated in the step of carbonizing biomass is utilized for the thermal decomposition and gasification. Furthermore, in the conventional system, it has been difficult to achieve evenness or uniformity of temperature distribution of thermal decomposition and gasification furnace.

Further, it has been desired to provide a technique for preventing the reaction residuals from adhering on the inners of the apparatus after the thermal decomposition and gasification of the carbonized biomass.

PRIOR ART DOCUMENTS

Patent Documents
Patent Document 1: Japanese Patent Laid-Open Publication No 2009-270050

Patent Document 2: Japanese Patent Laid-Open Publication No. 2013-185093

SUMMARY OF INVENTION

Problems to be Solved by Invention

The present invention has been provided with the above matters in the prior art being taken into consideration. One object of the present invention is to provide a biomass gasification system, in which the temperature of thermal decomposition and gasification furnace can be quickly and uniformly stabilized with smaller thermal loss. Another object of the present invention is to provide a biomass gasification system in which adherence of residuals on inner parts after the thermal decomposition and gasification of carbonized biomass is effectively prevented from occurring.

Means to Solve the Problems

According to an aspect of the invention, there is provided a biomass gasification system for producing aqueous gases after biomass is carbonized, the biomass gasification system comprising: a main body of a cylindrical form; a first cylindrical member which is accommodated in said main body and which has thermal storage characteristics; a first cut-out member of a substantially disk shape, which is arranged under said first cylindrical member; a first cylinder which penetrates in an axial direction said main body, said first cylindrical member and said first cut-out member; a first screw conveyor which is coaxially arranged within said first cylinder and which has a first shaft portion and a first blade portion spirally extending on the periphery of said first shaft portion; a second cylindrical member which is arranged below said first screw conveyor and which has thermal storage characteristics; a second cut-out member of a substantially disk shape, which is disposed under said second cylindrical member; a second cylinder which communicates with said first cylinder at a side wall of said first cylinder; and a second screw conveyor which is coaxially arranged within said second cylinder and which has a second shaft portion and a second blade portion spirally extending on the periphery of said second shaft portion; said first screw conveyor having a first gasifying agent inlet at one end of said first shaft portion; a plurality of first gasifying agent ports on a periphery of said first shaft portion; and a first gasifying agent passage in said first shaft portion which communicates said first gasifying agent inlet with said first gasifying agent ports; said second screw conveyor having a second gasifying agent inlet at one end of said second shaft portion; a plurality of second gasifying agent ports on a periphery of said second shaft portion; and a second gasifying agent passage in said second shaft portion which communicates said second gasifying agent inlet with said second gasifying agent ports; and said second cylindrical member having an internal space communicating with said first gasifying agent passage and a plurality of third gasifying agent ports at its periphery.

In the biomass gasification system of the instant invention, the first gasifying agent port is disposed near the upper first blade portion among opposing upper and lower first blade portions.

In the biomass gasification system of the instant invention, an additional first gasifying agent port may be provided at an under surface of said first blade portion.

In the biomass gasification system of the instant invention, the second blade portion is a ribbon type blade.

In the biomass gasification system of the instant invention, the first blade portion may be arranged at plural portions on said first shaft portion with a predetermined space being provided therebetween.

Effects Achieved by Invention

The biomass gasification system according to the invention wherein aqueous gasses are produced after carbonization of biomass makes it possible to quickly and uniformly stabilize the temperature of he thermal decomposition and gasification furnace with smaller thermal loss. The biomass gasification system according to the invention also makes it possible to effectively prevent residuals after thermal decomposition and gasification adhering on inner parts.

EMBODIMENT OF INVENTION

Now, some preferred embodiments of the invention will be explained hereunder with reference to the accompanying drawings.

Firstly, construction for obtaining a carbide by carbonizing a organic waste will be explained.

Figure 1:
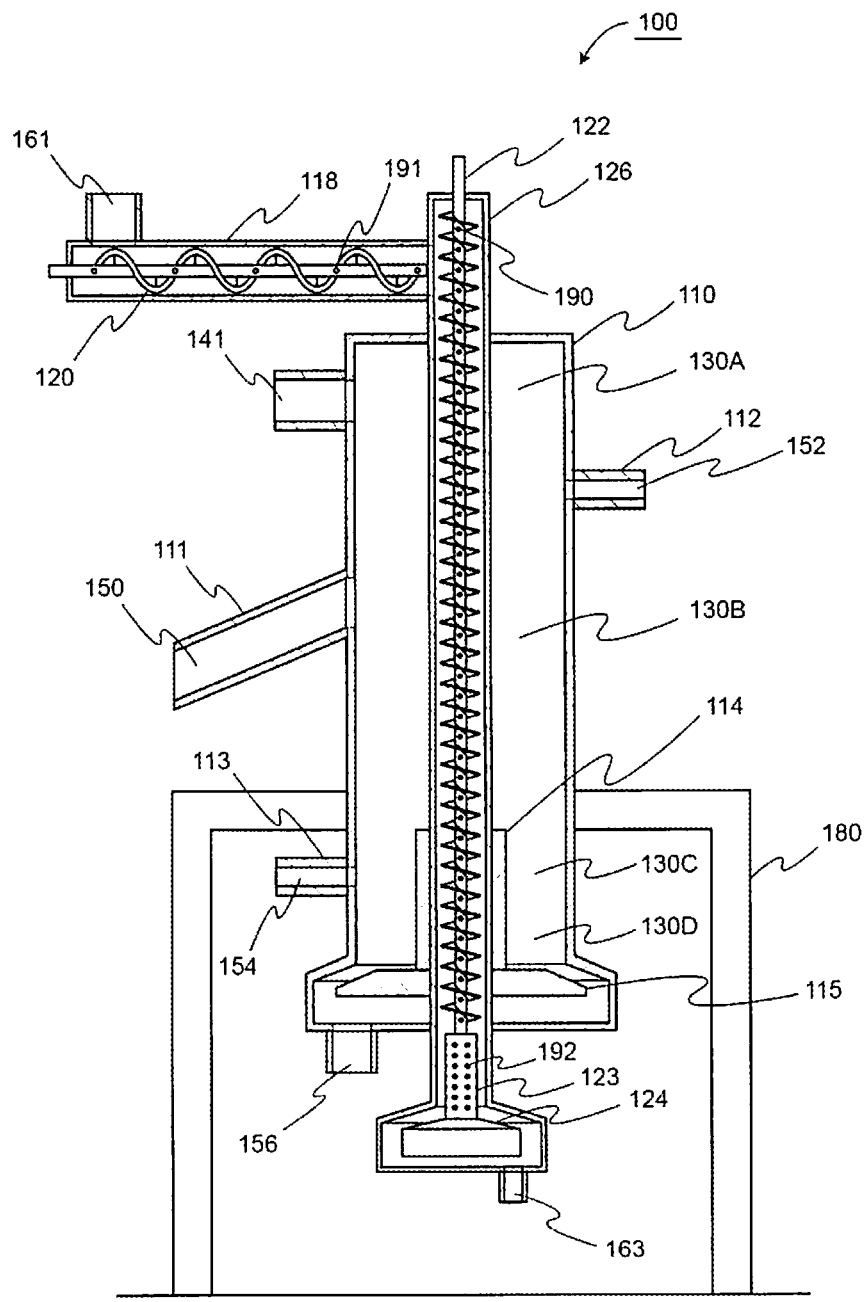
FIG. 1 is a partial sectional view showing the biomass gasification system 100 of the first embodiment of the present invention.
Figure 2:
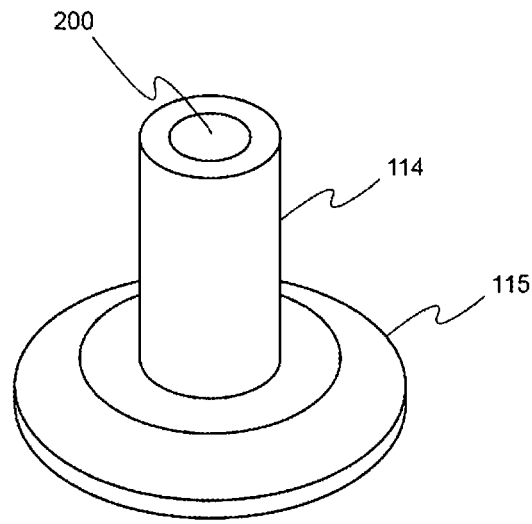
FIG. 2 is a perspective view showing a first cylindrical member 114 and a first cut-out member 115 of the first embodiment of the present invention.

FIG. 1 is a partial-sectional diagram which shows a biomass gasification system 100 of the first embodiment according to the invention. FIG. 2 is a perspective diagram which shows a first cylindrical member 114 and a first cut-out member 115 of the first embodiment of the invention.

The biomass gasification system includes a main body 110, the first cylindrical member 114 and the first cut-out member 115.

The main body 110 of the biomass gasification system 100 is perpendicularly supported by a supporting member 180. The shape of the main body 110 is not limitative but a tubular shape is preferable. Tubular means here that the cross-section shape is approximately tubular.

The height or dimension of the main body 110 is not limitative, and is may be arbitrarily selected depending on the amount of organic wastes to be processed or the amount of carbide to be produced. Material forming the main body 110 is not limited to specific one within the prior art materials. For example, stainless may well be selected.

Provided to the main body 110 are an organic waste inlet port 150 for organic wastes, a first air inlet port 152, a second air inlet port 154, an air exhaust port 141, an outlet port 156 and a burner (now shown in the drawings).

The organic wastes are introduced in the main body 110 through the organic waste inlet port 150. As shown in FIG. 1, the organic waste inlet port 150 may be formed by a tubular member 111. For the purpose of stably introducing the organic wastes into the inner chamber of the main body 110, for example, a belt-conveyor may be arranged within the tubular member 111.

The organic wastes (biomass) are wastes which include carbon. More specifically, the organic wastes include food wastes, construction wastes, shredder dusts, livestock wastes, sustainable harvested woods, pruned branches, paper dusts, bamboos, wood or grass wastes, sludge, rice straws, and household general or non-industrial wastes. It is desirable that water percentages of the organic wastes have been adjusted in advance by such means as a dryer for enhancing the efficiency of carbonization and yield of carbides.

Air used when the organic wastes are burned is supplied to the inner chamber of the main body 110 through the first air inlet port 152 and the second air inlet port 154. The port size or shape of the first and second air inlet ports 152 and 154 are not limitative. The first air inlet port 152 and second air inlet port 154 may be constituted by a tubular member 112 and a tubular member 113, respectively, and they are provided with fans for blowing air into the main body 110.

Thermal decomposition gases (mixed gases) generated when the organic wastes are burned are exhausted outside the main body 110 after secondary combustion, through the air exhaust port 141 which is arranged near the upper end position of the main body 110. Heat obtained through the secondary combustion is used as heat source for heating a first cylinder 126 and it is also used, for example, for generating steam after it is supplied to a superheated vapor generating device.

The organic wastes thrown in or introduced in the main body 110 are ignited by a burner (not shown). Such burner may be arranged at any desired position of the main body 110 as far as it is capable of igniting the organic wastes, and it is preferably positioned lower than the organic waste inlet port 115.

The biomass gasification system 100 according to the present invention is provided, within the main body 110, with a first cylindrical member 114 having heat storage characteristics. As shown in FIG. 2, the first cylindrical member 114 has an axis bore denoted by a reference numeral 200. The first cylindrical member 114 functions as so called a hot-bulb when the organic wastes are carbonized in the main body 110. The first cylindrical member 114 operates to promote carbonization of the organic wastes by applying radiant heat to the carbides therearound. The first cylindrical member 114 may be provided with any heating device for heating the member 114 itself. However, it is preferable that the first cylindrical member 114 is heated by the heat generated when the organic wastes are burning and the heat generated under the secondary combustion of the thermal decomposition gases.

In accordance with the rotation of the first cylindrical member 114, the peripheral portion thereof is uniformly heated, thereby enhancing the efficiency of carbonization and improving the purity of carbides. The mechanism for rotating the first cylindrical member 114 is not limitative. For example, a shaft extending from the bottom surface of the first cylindrical member 114 may be rotated by prior art techniques.

Under the cylindrical member 114, as shown in FIG. 2, there is integrally provided a cut-out or flange member 115 of a disc shape, which has the bore 200. The first cut-out member 115 functions to receive carbides produced in the main body 110 in operation. The first cut-out member 115 is so arranged that a gap is provided between the periphery thereof and the inner surface of the main body 110. In accordance with the rotation of the first cut-out member 115, the carbides received thereon efficiently drops through the gap between the periphery of the first cut-out member and the inner surface of the main body 110. Mass of carbides can be broken at the gap. The first cut-out member 115 may be integrally formed with the first cylindrical member 114 so that it rotates together with the cylindrical member 114. The first cut-out member 115 may be separately formed from the first cylindrical member 114. In this case, the first cut-out member 115 may be rotated independently.

The carbides dropped from the cut-out member 115 are discharged out the main body 110 through the outlet port 156 and, then, are forwarded into a second cylinder 118 through a throw-in inlet port 161. For the purpose of effectively exhausting the carbides from the outlet port 156, a scraper member (not shown) for raking the carbides may well be provided under the first cut-out member 115, which rotates together with the first cut-out member 115.

The inner chamber of the main body 110 can generally be divided into a burning area 130A, a carbonizing area 130B, a refining area 130C and an extinguishing area 130D. The burning area 130A generally covers a zone between a ceiling surface of the main body 110 and a position of the first air inlet port 152. The carbonizing area 130B generally covers a zone between the position of the first air inlet port 152 and an upper portion of the first cylindrical member 114. The refining area 130C generally covers a zone between the upper portion of the first cylindrical member 114 and a middle position of the first cylindrical member 114. The extinguishing area 130D generally covers a zone between the middle position of the first cylindrical member 114 and a position of the bottom surface of the first cylindrical member 114.

The burning area 130A functions to store thereat the thermal decomposition gases (mixed gases) including hydrogen (H), carbon monoxide (CO), carbon dioxide ($CO_2$), sulfur (S), nitrogen (N) and so on which are generated when the organic wastes burns, and the burning area 130A also functions to secondarily burn the thermal decomposition gases thereat. For appropriately constituting the burning area 130A in the main body 110, it is desirable that the first air inlet port 152 be arranged at a position lower than the upper end of the main body 110.

At the carbonizing area 130B, the organic wastes introduced in the main body 110 through the organic waste inlet port 150 are burned with contact of the combustion gas and carbonized. As the result of the burning and carbonizing of the organic wastes here, solid content having much carbides and thermal decomposition gas are produced.

At the refining area 130C, radiant heat generated from the first cylindrical member 114 which is heated by the heat generated when the organic wastes burn and the heat resulted from the secondary combustion of the thermal decomposition gases is applied to the carbides moving from the carbonizing area 130B and, in consequence, impurities are removed from the carbides by burning of the thermal decomposition gases existing in the carbides. Further, at the refining area 130C, carbonization is promoted or advanced under the condition where the carbides are kept at a high temperature while air is being supplied. For adequately forming the refining area 130C in the main body 110, it is desirable that the second air inlet port 154 be positioned between the uppermost surface and the middle portion of the first cylindrical member 114.

Finally, the extinguishing area 130D is a zone for extinguishing the carbides moving from the refining area 130C with blocked air.

Now, the construction for producing aqueous gases by the thermal decomposition and gasification of the carbides will be explained hereunder.

Figure 3:
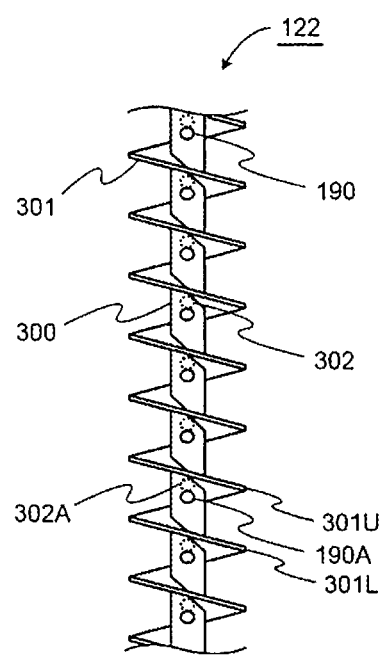
FIG. 3 is a front view showing a first screw-conveyor 122 of the first embodiment of the present invention.
Figure 4:
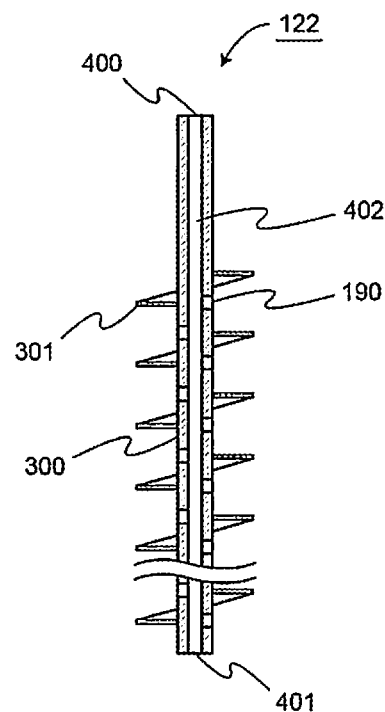
FIG. 4 is a sectional view showing a first screw-conveyor 122 of the first embodiment of the present invention.
Figure 5:
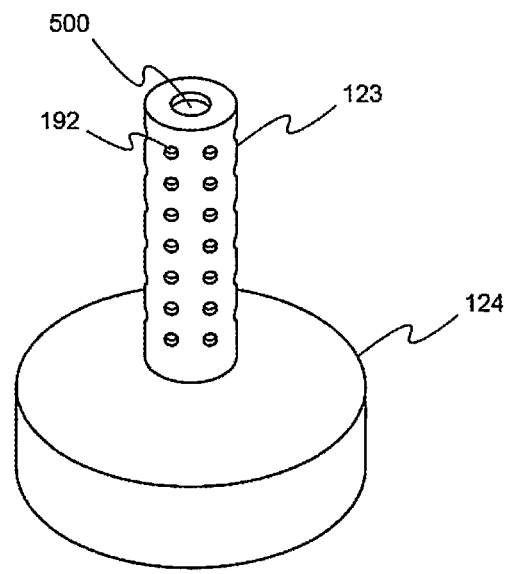
FIG. 5 is a perspective view showing a second cylindrical member 123 and a second cut-out member 124 of the first embodiment of the present invention.
Figure 6:
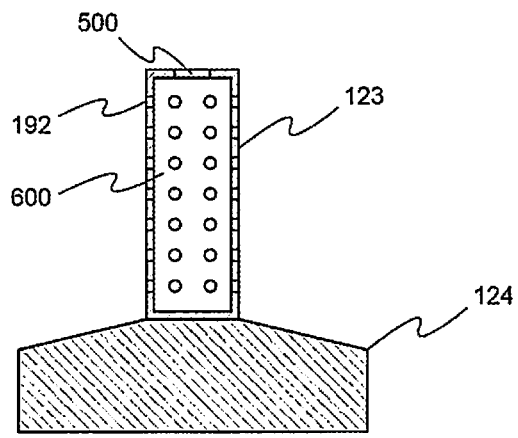
FIG. 6 is a sectional view showing a second cylindrical member 123 and a second cut-out member 124 of the first embodiment of the present invention.
Figure 7:
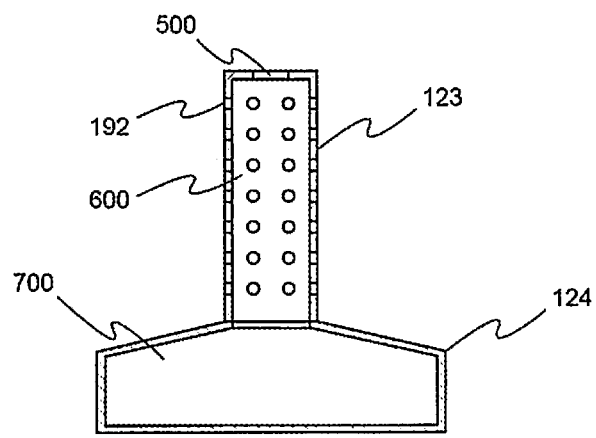
FIG. 7 is a sectional view showing a second cylindrical member 123 and a second cut-out member 124 of other embodiment of the present invention.
Figure 8:
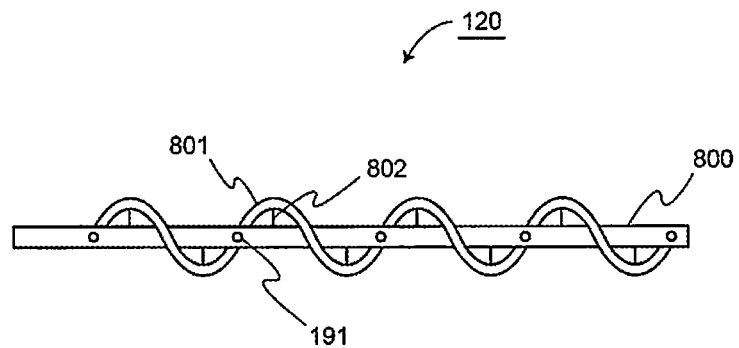
FIG. 8 is a front view showing a second screw-conveyor 120 of the first embodiment of the present invention.
Figure 9:
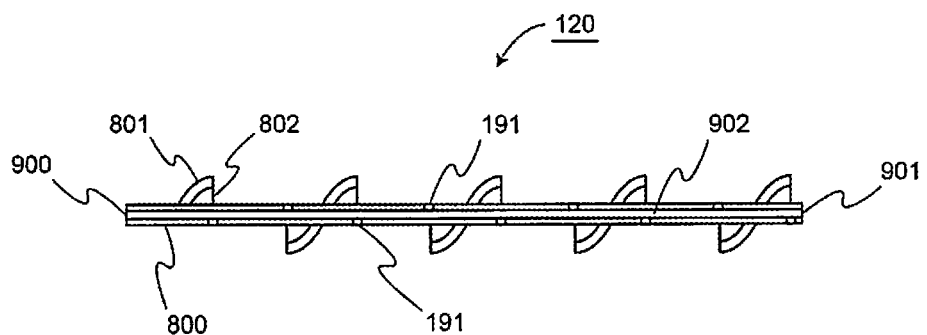
FIG. 9 is a sectional view of a second screw-conveyor 120 of the first embodiment of the present invention.

FIG. 1 is a partially sectioned diagram of the biomass gasification system 100 of the first embodiment according to the present invention. FIG. 3 is a front view of a first screw conveyor 122 of the first embodiment of the invention and FIG. 4 is a sectional view thereof. FIG. 5 is a perspective view of the second cylindrical member 123 and the second cut-out member 124 of the first embodiment of the invention and FIG. 6 is a sectional view thereof. FIG. 7 is a sectional view of the second cylindrical member 123 and the second cut-out member 124 of the second embodiment of the present invention. FIG. 8 is a front view of the second screw conveyor 120 of the first embodiment of the invention and FIG. 9 is a sectional view thereof.

The biomass gasification system 100 comprises the first cylinder 126, the first screw conveyor 122 which is rotatable within the first cylinder 126, the second cylindrical member 123, the second cut-out member 124, the second cylinder 118, and the second screw conveyor 120 which is rotatable within the second cylinder 118.

The first cylinder 126 is constituted in the form of tubular and it is so arranged that it penetrates axially through the main body 110, the first cylindrical member 114 and further the first cut-out member 115. As the first cylinder 126 is arranged as above so as to function as the thermal decomposition and gasification furnace, the first cylinder 126 is heated rapidly and uniformly by the heat generated when the organic wastes burn in the main body 110 and the heat obtained by the secondary combustion of the thermal decomposition gases. The first cylindrical member 126 is heated directly with smaller amount of heat loss owing to the heat generated when the organic wastes burn in the main body 110 and the heat resulted from the secondary burning of the thermal combustion gases. Furthermore, as the first cylinder 126 is arranged as above so as to function as the thermal decomposition and gasification furnace, the first cylindrical member 114 functions as so-called hot-bulb when the organic wastes are burned in the main body 110, the first cylindrical member 114 applies radiant heat to the carbides existing therearound whereby carbonization of the organic wastes is advanced. Furthermore, the first cylindrical member 114 heats the first cylinder 126 functioning as thermal decomposition and gasification furnace and it functions to heating and temperature keeping member for heating the first cylinder 126 and keeping its temperature.

The uppermost end of the first cylinder 126 is closed, while the lowermost end thereof is open with an outlet port 163 being provided thereat. From the outlet port 163, aqueous gases and reaction residue ash contents are output, which are produced when the carbides are thermal decomposed and gasified in the first cylinder 126.

The first screw conveyor (reaction stirring screw conveyor) 122 is axially arranged within the first cylinder 126.

As clearly illustrated in FIG. 3, the first screw conveyor 122 comprises a first shaft portion 300 and a first fin or blade portion 301 which is spirally extending around the first shaft portion 300. The carbides, which introduced in the first cylinder 126 through the communication port between the second cylinder 118 and the first cylinder 126, move to the direction of the second cylindrical member 123 within the first cylinder 126 in accordance with the rotation of the first screw conveyor 122. Here, as the first screw conveyor 122 rotates within the first cylinder 126, the first blade 301 thereon functions to stir the carbides and the reaction residuals and, in consequence, such carbides and the reaction residuals do not adhere on the inner wall of the first cylinder 126. Provided to the first shaft portion 300 are a plurality of first gasifying agent ports 190 for applying agents to the carbides while the carbides are moving in the first cylinder 126. Number of the first gasifying agent ports 190 on the first shaft portion 300 is not limitative, but for the purpose of sufficiently supplying the gasifying agents to the carbides moving within the first cylinder 126, it is preferable that a plurality of the first gasifying agent ports 190 be arranged with an appropriate space being provided between the adjacent gasifying agent ports 190. The position where the first gasifying agent ports 190 are provided on the shaft portion 300 is not limitative. Carbides moves within the first cylinder 126 in such manner that, in accordance with the rotation of the first screw conveyor 122, carbides are rubbed against the inner wall of the first cylinder 126, and the carbides moves while they slide on an upper surface of the first blade 301. With these moving actions of the carbides within the first cylinder 122 being taken into consideration, it is desirable that, as denoted with a reference numeral 302 in FIG. 3, the first gasifying agent port 190 be positioned near the upper blade portion between the two opposing upper and lower blades.

With reference to FIG. 3, the details of the position where the first gasifying agent port 190 on the shaft portion 300 will be explained. It is preferable that the first gasifying agent port 190 be arranged at the position near the upper first blade portion 301U between the two opposing upper and lower blades 301U and 301L. That is, the position designated by a reference numeral 302A is preferable. By positioning the first gasifying agent ports 190 on the shaft portion 300 as above, clogging in the first gasifying agent ports 190 by the carbides moving within the first cylinder 126 can be effectively prevented from occurring.

As shown in FIG. 4, the first screw conveyor 122 has at its uppermost end a first gasifying agent inlet 400 through which a gasifying agent is introduced into the first screw conveyor 122. The first screw conveyor 122 has therein a first gasifying agent passage 402. The first gasifying agent input in the first gasifying agent inlet 400 moves to the first gasifying agent port 190 through the first gasifying agent passage 402. The first screw conveyor 122 has at its lowermost end an open outlet 401. Through this open outlet 401, the first gasifying agent passage 402 communicates with the inner of the second cylindrical member 123 which is arranged under the first screw conveyor 122. The diameter of the first gasifying agent passage 402 is not limitative, and is may well be selected depending on the amount of gasifying agent supplied to the amount of carbides moving within the first cylinder 126 or the amount of gasifying agent needed to be forwarded to the inner of the second cylindrical member 123.

The dimension (diameter) or size of the first screw conveyor 122 is not limitative. With the thermal expansion of various elements being taken into consideration, the dimension of the first screw conveyor 122 should be designed to provide a gap between the periphery of the first screw conveyor 122 and the inner surface of the first cylinder 126. The material constituting the first screw conveyor 122 is not limitative. The first screw conveyor 122 may well be formed by, for example, SUS310S stainless steel among various prior art materials.

At the lower portion of the first screw conveyor 122, there is provided the second cylindrical member (stagnation reaction cylinder) 123 which has thermal storage characteristics. The second cylindrical member 123 is of a substantially column shape and it makes the sectional area defined by the first cylinder 123 small here so that the carbides tend to stagnate here when they pass at the side of the second cylindrical member 123. The second cylindrical member 123 functions as a so-called hot-bulb when carbides are subjected to thermal decomposition and gasification within the first cylinder 126. The second cylindrical member 123 further functions to promote or advance the thermal decomposition and gasification by applying radiant heat to the carbides stagnating and existing therearound. Although the second cylindrical member 123 may have a heating device for heating itself, it is preferable that the second cylindrical member 123 be heated by the heat generated when the organic wastes burn in the main body 110 and the heat obtained through the secondary combustion of the thermal decomposition gases.

The second cylindrical member 123 is adapted to rotate as an axis of a vertical line passing through the bottom surface and ceiling surface of the second cylindrical member 123. In accordance with the rotation of the second cylindrical member 123, the periphery of this second cylindrical member 123 is uniformly heated whereby the efficiency of thermal decomposition and gasification of the carbides is highly enhanced or improved. The second cylindrical member 123 may be integrally connected to the first screw conveyor 122 and then it may be rotated together with the first screw conveyor 123. Otherwise, the second cylindrical member 123 may be rotated independently from the first screw conveyor 122.

As shown in FIG. 5, at the upper surface of the second cylindrical member 123, there is provided an opening 500 corresponding to the open outlet (FIG. 4) of the first screw conveyor 122. In the peripheral side portion of the second cylindrical member 123, there are provided a plurality of third gasifying agent ports 192 for supplying gasifying agents to the carbides existing therearound. Number of the third gasifying agent ports 192 and locations where they are arranged on the second cylindrical member 123 are not limitative. However, for the purpose of sufficiently supplying the gasifying agents to the carbides existing therearound, it is desirable that a plurality of ports 192 are provided all around the periphery of the second cylindrical member 123.

As shown in FIG. 6, the second cylindrical member 123 has an internal space 600 communicating with the first gasifying agent passage 402 (FIG. 4) through the open outlet 401 (also in FIG. 4) and the opening 500. The gasifying agents introduced through the first gasifying agent inlet 400 and then forwarded to the internal space 600 through the first gasifying agent passage 402 are supplied to the carbides existing around the second cylindrical member 123, through the third gasifying agent ports 192.

Under the second cylindrical member 123, there is provided the second cut-out member 124 which is of a substantial disk shape and which is rotatable. The second cut-out member 124 functions to receive ash contents (reaction residuals) produced when the carbides are subjected to the thermal decomposition and gasification within the first cylinder 126. The second cut-out member 124 is so arranged in the first cylinder 126 that a gap is provided between the periphery thereof and the inner surface of the first cylinder 126. The rotation of the second cut-out member 124 makes it easy that the ash contents drop between the gap defined by the periphery of this cut-out member 124 and the inner surface of the first cylinder 126.

The ash contents dropped down from the second cut-out member 124 are output outside the first cylinder 126 through the outlet port 163. For the purpose of effectively outputting the ash contents through the output port 163, for example, a scraper member (not shown) which rotates together with the second cut-out member 163 may well be provided under the second cut-out member 163.

The second cut-out member 124 may be formed in a solid state as shown in FIG. 6 or may be formed to have an internal space 700 as shown in FIG. 7. In the latter case, by communicating the internal space 700 with the internal space 600, the amount of, the first gasifying agents introduced through the first gasifying inlet 400 can be increased.

Referring back to FIG. 1, the second cylinder (carbide conveying cylinder) 118 may be formed in a tubular shape. One end of the second cylinder 118 communicates with the first cylinder 126 near the upper end of the first cylinder 126. Near the other end of the second cylinder 118, there is provided the throw-in inlet port 161 through which the carbides output from the outlet port 156 are introduced into the second cylinder 118.

The second screw conveyor (crusher screw conveyor) 120 is arranged coaxially within the second cylinder 118.

As shown in FIG. 8, the second screw conveyor (crusher screw conveyor) 120 comprises a second shaft portion 800 and a second fin or blade portion 801 spirally extending around the second shaft portion 800. In accordance with rotation of the second screw conveyor 120, the carbides introduced through the inlet port 161 are forwarded within the second cylinder 118 toward the connection point between this second cylinder 118 and the first cylinder 126. Here, as the rotation of the second screw conveyor 120 functions to rake the carbides and the reaction residuals by its blade portion 801, the carbides and the reaction residuals are prevented from adhering on the inner surface of the second cylinder 118. On the periphery of the second shaft portion 800, there are provided a plurality of second gasifying agent ports 191 for supplying gasifying agents to the carbides moving within the second cylinder 118. Again number of the second gasifying agent ports 191 is not limitative. For the purpose of sufficiently supplying the gasifying agents to the carbides moving in the second cylinder 118, it is desirable that a plurality of ports 191 be arranged with an appropriate space being provided between adjacent ports 191. Positions where the gasifying agent ports 191 on the shaft portion 800 are arranged are not limitative and may be selected arbitrarily with design choice.

For assisting more effective thermal decomposition and gasification of the carbides in the first cylinder 126 to follow, it is desirable that surface areas of the carbides be large in advance by the crushing in the second cylinder 118. For this purpose, it is desirable that the second screw conveyor 120 forward the carbides thrown in through the throw-in inlet port 161 toward the connection point while the carbides being crushed by the second screw conveyor 120. To this end, the second blade portion 801 is preferably a ribbon type screw. The second blade portion 801 is supported by a plurality of supporting members 802. The dimension, shape and constituting material are not limitative and they may well be selected depending on the degree of crushing needed and the strength or rigidity needed.

As shown in FIG. 9, the second screw conveyor 120 has at its one end a second gasifying agent inlet port 900 for introducing gasifying agents within the second screw conveyor 120. The second screw conveyor 120 has therein a second gasifying agent passage 902 for forwarding the gasifying agents introduced through the second gasifying agent inlet port 900 to the second gasifying agent ports 191. The diameter of the second gasifying agent passage 902 is not limitative and it may be selected arbitrarily depending on the amount of the gasification agents supplied to the carbides moving within the second cylinder 118. The other end of the second screw conveyor 120 may well be open with an open port 901.

Now, the actual operation of the biomass gasification system 100 of one preferred embodiment according to the present invention will be explained.

The biomass gasification system 100 of the present invention operates in accordance with the following sequential steps:

(1) Step for introducing organic wastes;
(2) Step for burning and carbonizing the organic wastes;
(3) Step for extinguishing the carbonized organic wastes;
(4) Step for discharging the extinguished carbides;
(5) Step for throwing-in the discharged carbides;
(6) Step for crushing the thrown-in carbides;
(7) Step for thermal decomposing and gasifying the crushed carbides;
(8) Step for exhausting the produced aqueous gases and reaction residuals.

Hereunder, respective steps (1) through (8) will be explained.

(1) Step for Introducing Organic Wastes

Organic wastes are thrown-in in the main body 110 through the organic waste inlet port 150 by prior art techniques.

(2) Step for Burning and Carbonizing the Organic Wastes

Organic wastes introduced or thrown-in into the main body 110 are burned and carbonized at the carbonizing area 130B. More specifically, the organic wastes are ignited by, for example, a burner and are burned with air being supplied in the main body 110 from the first air inlet port 152. As a result of sufficient burning of the organic wastes in the main body 110, there are produced solid contents having much carbides and thermal decomposition gases. The solid contents having much carbides are forwarded to the refining area 130C while the thermal decomposition gases are forwarded to the burning area 130A and subjected to the secondary combustion thereat. The heat obtained through the secondary combustion contributes to heat the first cylindrical member 114 and also contributes to heat rapidly and uniformly the first cylinder 126 with small heat loss. Because, in the solid contents moved to the refining area 130C which have much carbides, there are thermal decomposition gases, if they are extinguished as they are, impurities involved in the carbides become great or large and yields of carbides are likely to be low. To cope with these problems, in this refining step, by applying radiant heat to the solid contents having much carbides from the first cylindrical member 114 while sufficient air is being supplied through the second air inlet 154, burning of thermal decomposition gases existing in the solid contents having much carbides is promoted or advanced and, therefore, carbonization is efficiently promoted. In this way, the thermal decomposition gases existing in the solid contents having much carbides are efficiently removed therefrom. According to the rotation of the first cylindrical member 114, the periphery of the first cylindrical member 114 is uniformly heated and, in consequence, carbonization is uniformly performed. In this refining step, it is preferable that temperatures around the organic waste inlet port 150 and the burning area 130A be kept at 800° C. to 1000° C. and the temperature at the refining area 130C be kept at in the order of 600° C. to 800° C. If retention time of the thermal decomposition gases in the burning area 130A is longer than 2 seconds, generation of dioxin is effectively reduced.

(3) Step for Extinguishing the Carbonized Organic Wastes

The carbides resulted from sufficient carbonization of the solid contents having much carbides at the previous refining area 130C then move to the extinguishing area 130D. Because this extinguishing area 130C is a low-oxygen atmosphere, the carbides moved to this extinguishing area 130C are extinguished here.

(4) Step for Discharging the Extinguished Carbides

The carbides extinguished at the previous extinguished area 130D drop down through the gap between the periphery of the first cut-out member 115 and the inner surface of the main body 110 and, then, they are discharged out main body 110 through the outlet port 156.

(5) Step for Throwing-in the Discharged Carbides

The carbides exhausted out the main body 110 through the outlet port 156 in the previous step are then introduced in the second cylinder 118 though the throw-in inlet port 161. Here, means for transporting the carbides from the outlet port 156 to the throw-in inlet port 161 are not limitative and, such as a packet conveyor in the prior art techniques can well be used.

(6) Step for Crushing the Thrown-in Carbides

The carbides introduced in the second cylinder 118 through the throw-in inlet port 161 are moved toward the connecting portion of the first cylinder 126 due to the compelling force by rotation of the second screw conveyor 120. It is preferable that the thrown-in carbides be subjected to crushing action within the second screw conveyor 120 while they are being moved to the connecting portion within the conveyor 120. Further, it is desirable that aqueous gasification reaction and water gas shift reaction, which are explained hereinafter, advance in the carbides introduced in the second cylinder 118 while the carbides are being moved to the connecting portion. Here, as the second cylinder 118 is communicated with the first cylinder 126, the inner space of the second cylinder 118 is kept at a high temperature as is in the same the first cylinder 126. Vapor as a gasifying agent is introduced in the second screw conveyor 120 through a second gasifying agent inlet 900, then moves in a second gasifying agent passage 902, then jets out through a plurality of second gasifying ports 191, whereby the gasifying agent is supplied to the carbides moving within the second cylinder 118.

(7) Step for Thermal Decomposing and Gasifying the Crushed Carbides

The carbides reached the inner space of the first cylinder 126 due to the rotation of the second screw conveyor 120 moves within the first cylinder 126 toward the second cylindrical member 123 due to the ration of the first screw conveyor 122 and, during this movement, water gas reaction ($C+H_2O \rightarrow CO+H_2-28.36$ kcal/mol) and water gas shift reaction ($CO+H_2O \rightarrow CO_2+H_2+9.85$ kcal/mol) continuously progress or advance. At this time, as the carbides move due to rotation of the first screw conveyor 122 while they are being rubbed against the inner wall of the first cylinder 126, the carbides are directly heated by the first cylinder 126 and thus the thermal decomposition and gasification of the carbides are promoted. Here, the first cylinder 126 is heated by the heat generated when the organic wastes burn within the main body 110 and the heat obtained by the secondary combustion of the thermal decomposition gases. As the carbides move on an upper surface of a first blade portion 301 as if they slide thereon in accordance with the rotation of the first screw conveyor 122, the carbides are directly heated by the first blade portion 301 whereby the thermal decomposition and gasification thereof are effectively promoted or advanced. Here, the first blade portion 301 is also heated by the heat generated when the organic wastes burn within the main body 110, the heat obtained by the secondary combustion of the thermal decomposition gases and further the radiant heat generated from the first cylinder 126. Vapor as a gasifying agent is introduced within the first screw conveyor 122 through a first gasifying agent inlet 400, then moves in a first gasifying agent passage 402, and finally is jetted out through a plurality of first gasifying agent ports 190, whereby vapor is supplied to the carbides moving within the first cylinder 126. As a result, thermal decomposition gases (water or aqueous gases) which include as contents hydrogen (H), carbon monoxide (CO and carbon dioxide ($CO_2$) are produced. Generally, at low temperatures (750° C. to 800° C.), as water gas shift reaction of exothermic reaction is promoted and hydrogen of low calorie is produced while carbon monoxide of high calorie is consumed, thermal decomposition gases of rich in hydrogen and of lower calorific values per unit volume are produced. To the contrary, in general, at high temperatures (900° C. to 950° C.), thermal decomposition gases of rich in carbon monoxide are produced. Furthermore, the ratio of $H_2/CO$ in the thermal decomposition gases becomes higher in proportion to increase of amount of the supply of vapor as the gasifying agent. Thermal decomposition and gasification of the carbides reached near the second cylindrical member 123 is further advanced by radiant heat generated by the second cylindrical member 123 and vapor jetted out through a plurality of third gasifying agent ports 192. Due to the rotation of the second cylindrical member 123, the periphery of this second cylindrical member 123 is uniformly or evenly heated, whereby the necessary thermal decomposition and gasification action is enhanced.

(8) Step for Exhausting the Produced Aqueous Gases and Reaction Residuals

The water or aqueous gases produced by the thermal decomposition and gasification of the carbides within the first cylinder 126 are derived from the outlet port 163. Ash contents (reaction residuals) generated after the thermal decomposition and gasification of the carbide within the first cylinder 126 drop down the gap defined by the periphery of the second cut-out member 124 and the inner surface of the first cylinder 126 and they are exhausted out the first cylinder 126 through the same outlet port 163. The resulted aqueous gases of gas and the reaction residuals of solid may well be separated by, for example, a cyclone.

Finally, with reference to FIG. 10, the first screw conveyor 122 of another embodiment according to the present invention will be explained hereunder.

Figure 10:
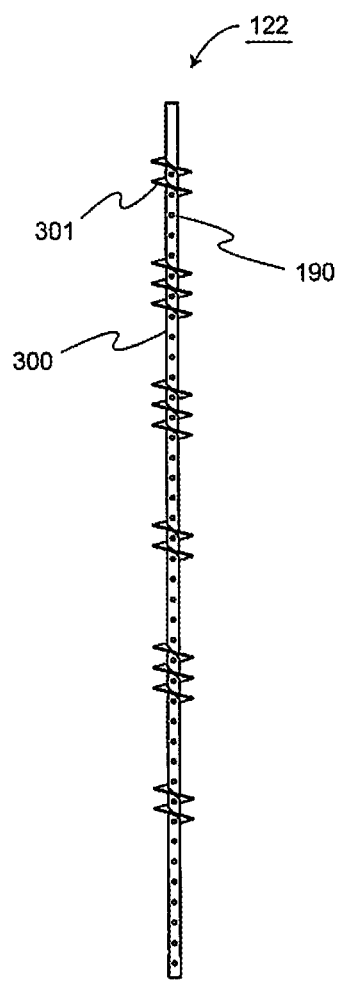
FIG. 10 is a front view showing a first screw conveyor 122 of other embodiment of the present invention.

FIG. 10 is a front view of the first screw conveyor 122 of another embodiment of the instant invention. As shown therein, a plurality of first blade portions 301 are arranged at plural positions on the first shaft portion 300 axially scattered thereon. By so arranging the first blade portions 301 on the common shaft portion 300, the carbides move more quickly at the areas where the first blade portions are not provided. For this reason, time of movement of the carbides within the first cylinder 126, that is, time of thermal decomposition and gasification of the carbides therein can be adequately adjusted. At the positions where the first blade portions 301 are disposed, the carbides are subjected to the thermal decomposition and gasification while they are being rubbed against the inner wall of the first cylinder 126. If a plurality of first screw conveyors 122 in which the positions of the blade portions are different from one another and they are periodically exchanged, specific concentration on the inner surface of the first cylinder 126 where the rubbing action of the carbides against the inner wall of the first cylinder 126 occurs during thermal decomposition and gasification is prevented from occurring, thereby making it possible to achieve the long life of the first cylinder 126.

It should be noted that, although the preferred embodiments of the present invention have been explained hereinabove with reference to the appended drawings, various modifications and changes can be made without departing from the spirit and scope of the invention.

For example, the first gasifying agent port 190 may well be provided under (on rear side of) the first blade portion 301. Because the carbide move within the first cylinder 126 in such manner that they move while they are being rubbed against the inner wall of the first cylinder 126 and slide on the upper surface of the first blade portion 301, provision of the first gasifying agent ports 190 on the lower surface (rear side) of the first blade portion 301 makes it possible to effectively prevent clogging of carbides in the first gasifying agent ports 190 from occurring.

The invention claimed is:

1. A biomass gasification system for producing aqueous gases after biomass is carbonized, said biomass gasification system comprising:
   a main body of a cylindrical form;
   a first cylindrical member which is accommodated in said main body and which has thermal storage characteristics;
   a first cut-out member of a substantially disk shape, which is arranged under said first cylindrical member;
   a first cylinder which penetrates in an axial direction said main body, said first cylindrical member and said first cut-out member;
   a first screw conveyor which is coaxially arranged within said first cylinder and which has a first shaft portion and a first blade portion spirally extending on the periphery of said first shaft portion;
   a second cylindrical member which is arranged below said first screw conveyor and which has thermal storage characteristics;
   a second cut-out member of a substantially disk shape, which is disposed under said second cylindrical member;
   a second cylinder which communicates with said first cylinder at a side wall of said first cylinder; and
   a second screw conveyor which is coaxially arranged within said second cylinder and which has a second shaft portion and a second blade portion spirally extending on the periphery of said second shaft portion;
   said first screw conveyor having a first gasifying agent inlet at one end of said first shaft portion; a plurality of first gasifying agent ports on a periphery of said first shaft portion; and a first gasifying agent passage in said first shaft portion which communicates said first gasifying agent inlet with said first gasifying agent ports;
   said second screw conveyor having a second gasifying agent inlet at one end of said second shaft portion; a plurality of second gasifying agent ports on a periphery of said second shaft portion; and a second gasifying agent passage in said second shaft portion which communicates said second gasifying agent inlet with said second gasifying agent ports; and
   said second cylindrical member having an internal space communicating with said first gasifying agent passage and a plurality of third gasifying agent ports at its periphery.

2. A biomass gasification system according to claim 1, wherein each of said plurality of first gasifying agent ports is disposed near the upper first blade portion among opposing upper and lower first blade portions.

3. A biomass gasification system according to claim 1, further comprising an additional first gasifying agent port at an under surface of said first blade portion.

4. A biomass gasification system according to claim 1, where said second blade portion is of a ribbon type.

5. A biomass gasification system according to claim 1, wherein said first blade portion is arranged at plural portions on said first shaft portion in an axial direction.

* * * * *